United States Patent
Kojima

(10) Patent No.: US 7,153,610 B2
(45) Date of Patent: Dec. 26, 2006

(54) BATTERY AND NEGATIVE ELECTRODE PLATE FOR BATTERY

(75) Inventor: Kazuo Kojima, Koga (JP)

(73) Assignee: Sanoh Kogyo Kabushiki Kaisha, Koga (JP)

( * ) Notice: Subject to any disclaimer, the term of this patent is extended or adjusted under 35 U.S.C. 154(b) by 328 days.

(21) Appl. No.: 10/787,465

(22) Filed: Feb. 26, 2004

(65) Prior Publication Data
US 2004/0191625 A1    Sep. 30, 2004

(30) Foreign Application Priority Data
Mar. 27, 2003   (JP) ............................. 2003-087645

(51) Int. Cl.
   *H01M 2/22*   (2006.01)
   *H01M 2/26*   (2006.01)
(52) U.S. Cl. .................. 429/237; 429/94; 429/211
(58) Field of Classification Search ................ 429/236, 429/94, 211, 237
See application file for complete search history.

(56) References Cited

U.S. PATENT DOCUMENTS
6,241,790 B1 * 6/2001 Matsubara et al. ........ 29/623.1

FOREIGN PATENT DOCUMENTS
JP    2000-299100    10/2000

* cited by examiner

*Primary Examiner*—Mark Ruthkosky
(74) *Attorney, Agent, or Firm*—Ladas & Parry LLP

(57) ABSTRACT

There is provided a battery and a negative electrode for the battery, which are capable of being simply produced by a smaller number of steps. The battery includes: a battery can (7); a negative electrode plate for battery (21), the negative electrode plate having a paste-like material which contains an active material and which is provided on the entire surface of a rectangular conductive porous substrate including edge portions (22a) extending along long sides of the substrate, the negative electrode plate being wound in a cylindrical shape to be inserted into the battery can; and a plate-shaped collector (28) having ribs (31) formed by raising part thereof, the ribs being resistance-welded to one of the edge portions of the conductive porous substrate while the paste-like material provided on the edge portions.

5 Claims, 5 Drawing Sheets

BATTERY AND NEGATIVE ELECTRODE PLATE FOR BATTERY

BACKGROUND OF THE INVENTION

1. Field of the Invention

The present invention generally relates to a battery and a negative electrode plate for a battery. More specifically, the invention relates to a nickel-hydrogen battery and a negative electrode plate for a battery.

2. Description of the Prior Art

As shown in FIG. 8, a negative electrode plate 1 of a conventional nickel-hydrogen battery comprises a rectangular substrate 2 and a paste-like material 3 which is filled therein to be rolled and which contains an active material. The substrate 2 is formed from a porous plate, such as a mesh or punching metal plate, which is made of a nickel plated soft steel. The paste-like material 3 contains a hydrogen absorbing alloy, a conductive material, a binder and a dispersing agent.

In the negative electrode plate 1 of the conventional nickel-hydrogen battery, a collecting tab 5 is an elongated strip-like conductive plate extending longitudinal directions. As shown in FIG. 9, one end portion of the collecting tab 5 is welded to a substrate exposed portion 4, which is obtained by removing a part of the paste-like material 3 from a longitudinally extending edge of the substrate 2, so that the collecting tab 5 extends in directions perpendicular to the longitudinal directions of the substrate 2. The negative electrode plate 1 with collecting tab 5 thus formed is wound so as to form a cylindrical body 6 as shown in FIG. 10. Thus, there is obtained a structure wherein the collecting tab 5 protrudes from the bottom end face of the cylindrical body 6. Then, the collecting tab 5 protruding from the bottom of the structure is bent so as to extend along the bottom face of the cylindrical body 6 as shown by reference number 5a in FIG. 11. Then, the negative electrode plate 1 having such a structure that is shown in FIG. 11 is inserted into a bottomed cylindrical battery can 7 as shown in FIG. 12, to cause the bent collecting tab 5a to contact a bottom plate 8 of the battery can 7 in a conductive state. Thereafter, the open top of the battery can 7 is closed by a lid 9 including a safety valve as is well known to complete a battery.

There is also known a negative electrode plate 11 shown in FIGS. 13 and 14. The negative electrode plate 11 comprises a rectangular substrate 12 and a paste-like material 13 which is filled therein to be rolled and which contains an active material. Along the overall length of one longitudinally extending edge of the rectangular negative electrode plate 11, a substrate exposed portion 14 having no layer of the paste-like material 3 is formed. In the substrate exposed portion 14, a porous surface of the conductive substrate 12 is exposed in a strip shape. A collecting tab 15 comprises a laterally elongated strip-like conductive plate extending along the substrate exposed portion 14. As shown in FIG. 14, the collecting tab 15 is bonded to the surface of the substrate exposed portion 14 by welding or the like so as to extend in longitudinal directions of the substrate exposed portion 14. The collecting tab 15 is resistance-welded to a collector (not shown) (see Japanese Patent Laid-Open No. 2000-299100).

In the conventional electrode plates for batteries as shown in FIG. 8 and so forth, it is required to form the substrate exposed portion 4 in the substrate 2 to weld the one end portion of the collecting tab 5 to the substrate 2, so that there is a problem in that it is required to carry out a large number of steps.

As shown in FIG. 13 and so forth, it is also required to form the substrate exposed portion 14 having no layer of the paste-like material 3 along the longitudinally extending edge of the negative electrode plate 11 to weld the collecting tab 15 to the surface of the substrate exposed portion 14 by welding or the like, so that there is a problem in that it is required to carry out a large number of steps.

SUMMARY OF THE INVENTION

It is therefore an object of the present invention to eliminate the aforementioned problems and to provide a battery and a negative electrode plate for the battery, which are capable of being easily produced by a smaller number of steps.

In order to accomplish the aforementioned and other objects, according to one aspect of the present invention, a battery comprises: a battery can; a negative electrode plate for battery, the negative electrode plate having a paste-like material which contains an active material and which is provided on the entire surface of a rectangular conductive porous substrate including edge portions extending along long sides of the substrate, the negative electrode plate being wound in a cylindrical shape to be inserted into the battery can; and a plate-shaped collector having ribs formed by raising part thereof, the ribs being resistance-welded to one of the edge portions of the conductive porous substrate while the paste-like material provided on the edge portions.

The plate-like collector may have cut-out portions which are formed so as to extend in a radial direction inwardly from a periphery thereof, the ribs being formed by raising part thereof along both of radially extending edges of each of the cut-out portions.

Preferably, 0.25<R<2.5 is satisfied assuming that a specific electrical resistance of the conductive porous substrate is rb, a thickness of the conductive porous substrate being tb, a ratio rb/tb of rb to rb being Rb, a specific electrical resistance of the plate-like collector being rc, a thickness of the plate-like collector being tc, a ratio rc/tc of tc to rc being Rc, and a ratio Rc/Rb of Rc to Rb being R.

The conductive porous substrate may be made of a steel, tb being in the range of from about 60 μm to about 80 μm, the plate-like collector being made of iron or nickel, and tc being in the range of from about 150 μm to about 200 μm.

The conductive porous substrate may be made of a punching metal.

According to another aspect of the present invention, there is provided a negative electrode plate for a battery, wherein a paste-like material containing an active material is provided on the entire surface of a rectangular conductive porous substrate including an edge portion extending along a long side thereof, the negative electrode plate being wound in a cylindrical shape to be inserted into a battery can to be used a part of a better.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiment of the present invention will be described below.

Figure 1:
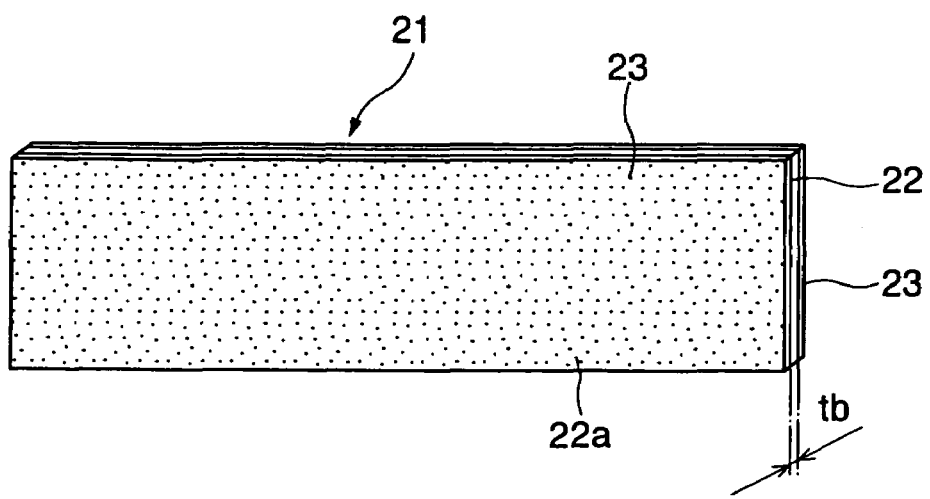
FIG. 1 is a perspective view of a negative electrode plate of a battery according to the present invention.

In FIG. 1, reference number 21 denotes a negative electrode plate of a nickel-hydrogen battery. The negative electrode plate 21 comprises a rectangular substrate 22 and a paste-like material 23 which is filled on both sides thereof to be rolled and which contains an active material. For example, the substrate 22 is formed from a porous plate, such as a mesh or punching metal plate, which is made of iron or a nickel plated soft steel product. As is well known, the paste-like material 23 is obtained by kneading a hydrogen absorbing alloy, a conductive material, a binder and a dispersing agent in the presence of water and by adjusting viscosity and temperature. The paste-like material 23 is applied on both sides of the substrate 22 to be filled in a hollow portion of the substrate 22, and then, rolled to be integrated with the substrate 22 so as to cover both sides of the substrate 22 as layers. As is well known, the hydrogen absorbing alloy contained in the paste-like material 23 allows charge or discharge by absorbing or discharging hydrogen if it is produced when the battery is charged or discharged.

According to the present invention, as shown in FIG. 1, the layer of the paste-like material 23 is formed on the entire surface of the substrate 22 including the longitudinally extending edge 22a of the substrate 22.

Figure 13:
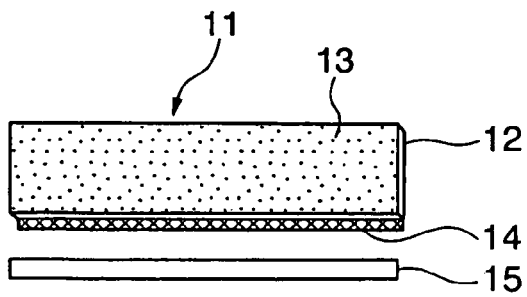
FIG. 13 is a perspective view of another conventional electrode plate before it is assembled.
Figure 14:
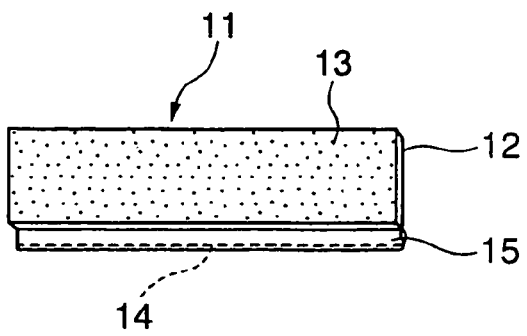
FIG. 14 is a perspective view of the conventional electrode plate when it is assembled.

On the other hand, a positive electrode plate 41, which is a mated electrode with the negative electrode plate 21, is also formed by filling a paste-like material of a predetermined material in a rectangular substrate and by rolling them. The positive electrode plate 41 may be obtained by forming the layer of the paste like material on the entire surface of the substrate similar to the negative electrode plate 21. Alternatively, the positive electrode plate 41 may be obtained by using the collecting tab 15 as shown in FIGS. 13 and 14.

Figure 2:
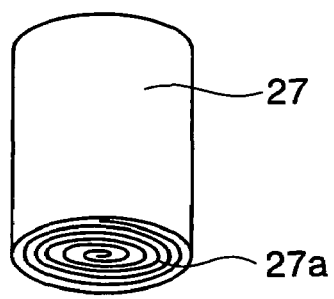
FIG. 2 is a perspective view of a cylindrical body formed by winding a negative electrode plate, a separator and a positive electrode plate.

The negative electrode plate 21 and the positive electrode plate 41 are wound via a separator 43 of a sheet-like insulating material to form a cylindrical body 27 as shown in FIG. 2. The cylindrical body 27 is formed by displacing the negative electrode plate 21 downwards with respect to the separator 43 and by displacing the positive electrode plate 41 upwards with respect to the separator 43. Therefore, the longitudinally extending edge 22a of the substrate 22 of the negative electrode plate 21, together with the paste-like material 23, is exposed in the bottom portion 27a of the cylindrical body 27.

Figure 3:
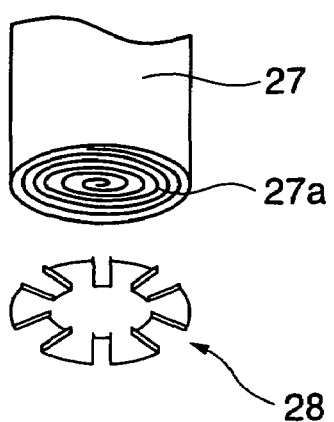
FIG. 3 is a perspective view of a collector for a negative electrode, which is to be bonded to a cylindrical body.
Figure 4:
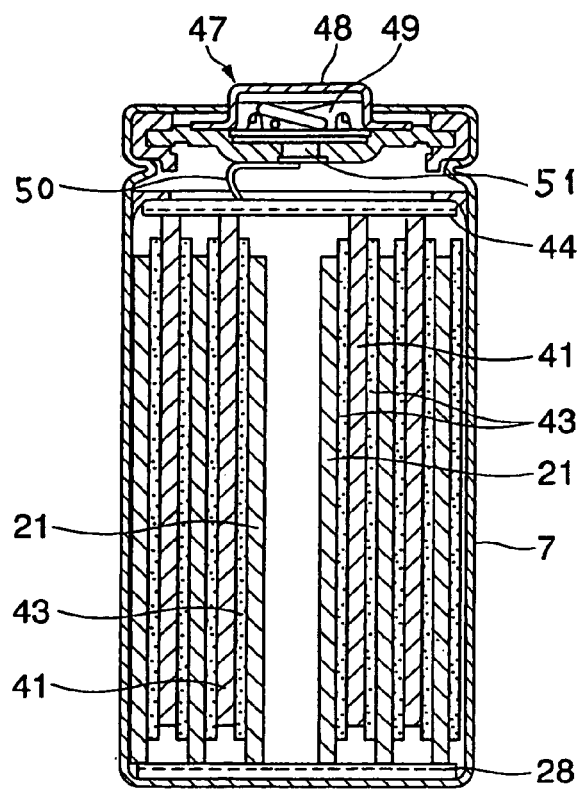
FIG. 4 is a sectional view of a battery according to the present invention.

As shown in FIG. 3, a collector for negative electrode 28 is welded to the longitudinally extending edge 22a on the bottom portion 27a of the cylindrical body 27 by resistance welding. Similarly, a collector for positive electrode 44 is welded to the positive electrode plate 41 on the top of the cylindrical body 27. The cylindrical body 27 to which the collector for negative electrode 28 and the collector 44 for positive electrode are welded is inserted into a cylindrical battery can 7 as shown in FIG. 4. The collector for negative electrode 28 is resistance-welded to the bottom portion of the cylindrical battery can 7. The collector for positive electrode 44 is provided so as to conduct to an external terminal 48 via members 50, 51. In FIG. 4, a lid 47 is caulked to be mounted on the top opening of the battery can 7 as is well known. Reference number 49 denotes a safety valve.

Figure 5:
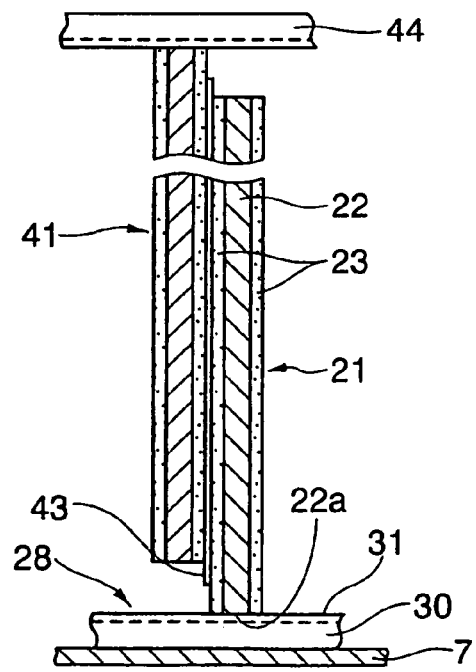
FIG. 5 is a sectional view showing the relationship between an electrode plate and a collector.

As shown in FIG. 5, the edge 22a of the substrate 22 of the negative electrode plate 21 is resistance-welded to a stand tab 31 of the collector for negative electrode 28 while the paste-like material 23 is provided on both sides thereof.

Figure 6:
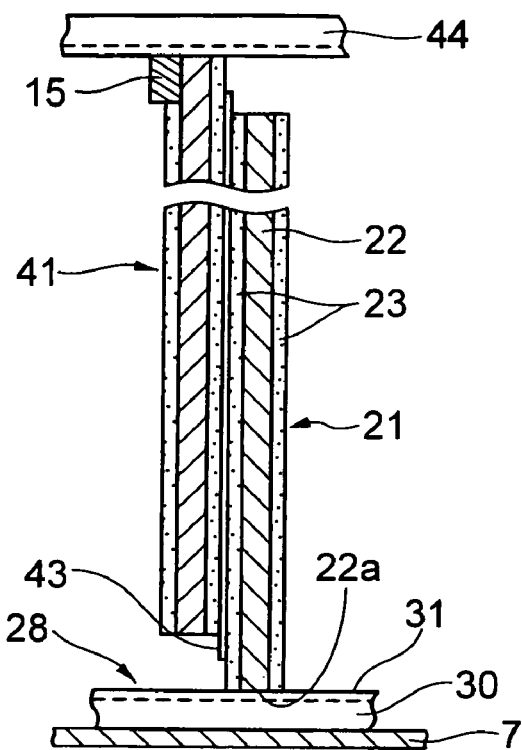
FIG. 6 is a sectional view showing a modified example of the example shown in FIG. 5.

In the example of FIG. 5, similar to the negative electrode plate 21, the positive electrode plate 41 is resistance-welded while the paste-like material is provided on the entire surface of the substrate of the positive electrode plate 41. However, as shown in FIG. 6, the collecting tab 15 shown in FIGS. 13 and 14 may be used.

The resistance welding of the negative electrode plate 21 to the collector for negative electrode 28 will be described below in detail.

Figure 7:
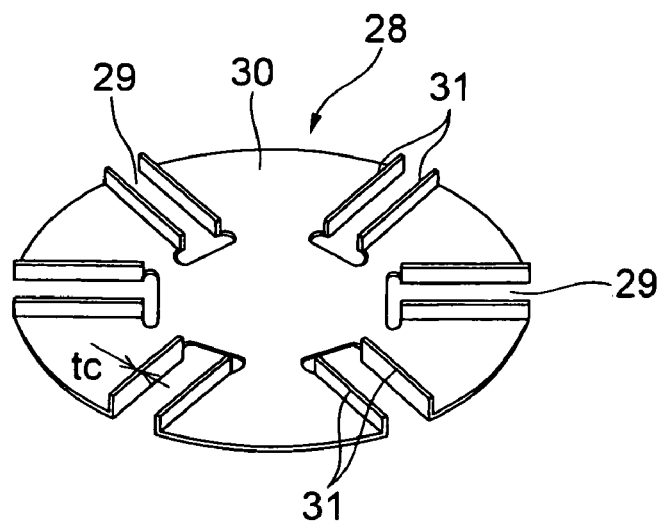
FIG. 7 is a perspective view of a collector for a negative electrode.
Figure 8:
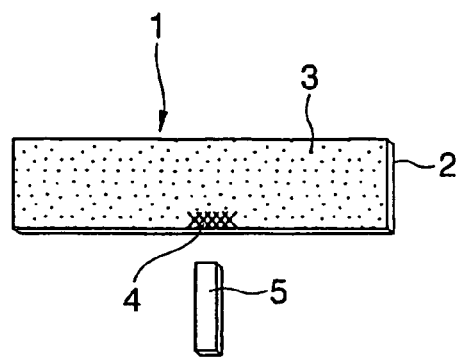
FIG. 8 is a perspective view of a conventional electrode plate before it is assembled.
Figure 9:
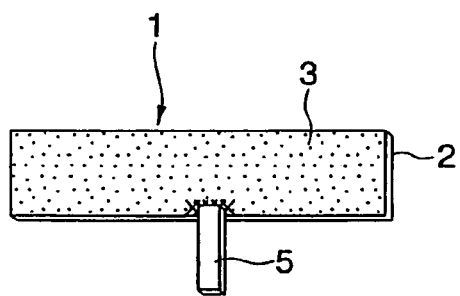
FIG. 9 is a perspective view of the conventional electrode plate when it is assembled.
Figure 10:
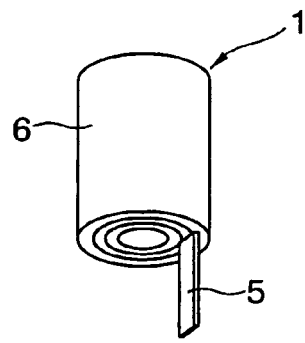
FIG. 10 is a perspective view of the conventional electrode plate when it is assembled after the state of FIG. 9.
Figure 11:
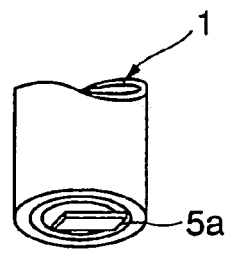
FIG. 11 is a perspective view of the conventional electrode plate before it is mounted into a battery can.
Figure 12:
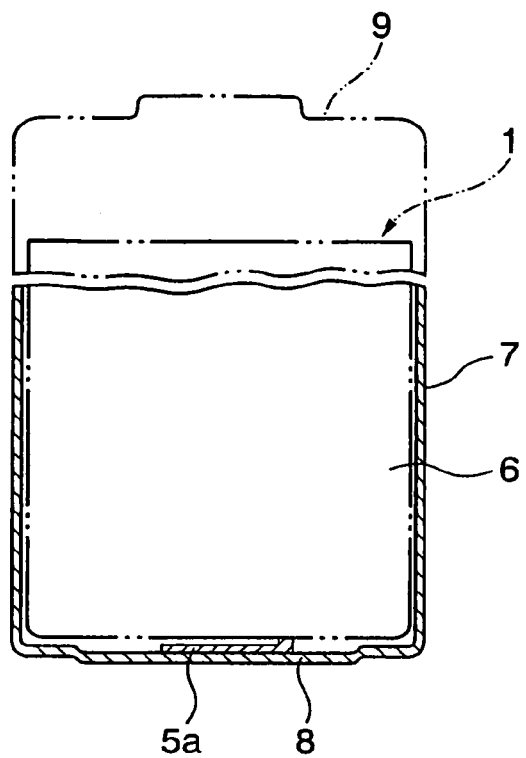
FIG. 12 is a longitudinal section of a part of a battery formed by installing the conventional electrode plate for battery into the battery can.

The collector for negative electrode 28 has a disk shape. As shown in FIG. 7, the collector for negative electrode 28 basically comprises a disk-shaped conductive metal plate 30, a plurality of cut-out portions 29 which extend in radial directions from the outer peripheral edge of the conductive metal plate 30, and stand ribs 31 which extend along both of radially extending edges of each of the cut-out portions 29.

As shown in FIGS. 3–5, the stand ribs 31 of the collector for negative electrode 28 are caused to cross and contact the longitudinally extending edge 22a on the bottom portion 27a of the cylindrical body 27 to bond the longitudinally extending edge 22a to the collector for negative electrode 28 by resistance welding. It is assumed that the thickness of the stand rib 31 is tc and the thickness of the substrate 22 is tb.

According to the present invention, the layer of the paste-like material 23 is provided on the longitudinally extending edge 22a. In this state, even if the longitudinally extending edge 22a of the negative electrode plate 21 is resistance-welded to the collector for negative electrode 28, the negative electrode plate 21 can be appropriately bonded to the collector for negative electrode 28 while preventing the paste-like material 23 from flying due to heat or the like.

In order to ensure this, the inventor of the present invention has found that a predetermined relationship is preferably established between the electrical resistance and thickness of the substrate 22 forming the negative electrode plate 21 and the electrical resistance and thickness of the collector for negative electrode 28.

Assuming that the specific electrical resistance of the substrate 22 of the negative electrode plate 21 was rb, the thickness thereof being tb, the ratio rb/tb between rb and tb being Rb, the specific electrical resistance of the collector for negative electrode 28 being rc, the thickness thereof being tc, the ratio rc/tc between rc and tc being Rc, and the ratio between Rc and Rb being R, then it was possible to appropriately bond the negative electrode plate 21 and the collector for negative electrode 28 to each other by resistance welding if 0.25<R<2.5 was satisfied. If R is in the above described range, most of current supplied from an electrode used for resistance welding can flow a contact portion between the negative electrode plate 21 and the collector for negative electrode 28 to contribute to resistance welding. On the other hand, if R is not in the above described range, most of current supplied from an electrode used for resistance welding flows a portion other than the contact portion between the negative electrode plate 21 and the collector for negative electrode 28 to provide a great deal of joule loss to fly the negative electrode plate 21 and the collector for negative electrode 28, so that there are some cases where it is not possible to appropriate bond the negative electrode plate 21 and the collector for negative electrode 28 to each other.

Examples will be described below. In the following examples, the specific electrical resistance of Fe at 20° C. is 9.71 μΩm, the specific electrical resistance of Ni at 20° C. is 6.84 μΩm, and the specific electrical resistance of Cu at 20° C. is 1.67 μΩm. In all of the following examples, the substrate 22 was made of a punching metal. The substrate 22 and the collector for negative electrode 28 do not have a practical working strength if they are too thin. In all of the following examples, the substrate 22 and the collector for negative electrode 28 had such a practical thickness that their functions can be obtained.

EXAMPLE 1

The substrate 22 was made of a steel containing Fe as a principal component, and tb was about 80 μm. The collector for negative electrode 28 was made of a steel containing Fe as a principal component, and tc was about 150 μm. The rb of the substrate is approximately 9.71 μΩm, and rc of the collector for negative electrode 28 is approximately 9.71 μΩm. The ratio R of Rc (=rc/tc) to Rb (=rb/tb) is R=Rc/Rb=0.53. The value of R being 0.53 satisfies 0.25<R<2.5. In this case, the substrate 22 and the collector for negative electrode 28 were appropriately bonded to each other by resistance welding without flying the paste-like material 23.

EXAMPLE 2

The substrate 22 was made of a steel containing Fe as a principal component, and tb was about 80 μm. The collector for negative electrode 28 was made of a steel containing Fe as a principal component, and tc was about 200 μm. In this case, R=Rc/Rb=0.40. The value of R being 0.40 satisfies 0.25<R<2.5. In this case, the substrate 22 and the collector for negative electrode 28 were appropriately bonded to each other by resistance welding without flying the paste-like material 23.

EXAMPLE 3

The substrate 22 was made of a steel containing Fe as a principal component, and tb was about 80 μm. The collector for negative electrode 28 was made of a steel containing Ni as a principal component, and tc was about 100 μm. In this case, R=Rc/Rb=0.56. The value of R being 0.56 satisfies 0.25<R<2.5. In this case, the substrate 22 and the collector for negative electrode 28 were appropriately bonded to each other by resistance welding without flying the paste-like material 23.

EXAMPLE 4

The substrate 22 was made of a steel containing Fe as a principal component, and tb was about 80 μm. The collector for negative electrode 28 was made of a steel containing Ni as a principal component, and tc was about 150 μm. In this case, R=Rc/Rb=0.38. The value of R being 0.38 satisfies 0.25<R<2.5. In this case, the substrate 22 and the collector for negative electrode 28 were appropriately bonded to each other by resistance welding without flying the paste-like material 23.

EXAMPLE 5

The substrate 22 was made of a steel containing Fe as a principal component, and tb was about 80 μm. The collector for negative electrode 28 was made of a steel containing Ni as a principal component, and tc was about 200 μm. In this case, R=Rc/Rb=0.28. The value of R being 0.28 satisfies 0.25<R<2.5. In this case, the substrate 22 and the collector for negative electrode 28 were appropriately bonded to each other by resistance welding without flying the paste-like material 23.

EXAMPLE 6

The substrate 22 was made of a steel containing Fe as a principal-component, and tb was about 60 μm. The collector for negative electrode 28 was made of a steel containing Fe as a principal component, and tc was about 150 μm. In this case, R=Rc/Rb=0.40. The value of R being 0.40 satisfies 0.25<R<2.5. In this case, the substrate 22 and the collector for negative electrode 28 were appropriately bonded to each other by resistance welding without flying the paste-like material 23.

EXAMPLE 7

The substrate 22 was made of a steel containing Fe as a principal component, and tb was about 60 μm. The collector for negative electrode 28 was made of a steel containing Fe as a principal component, and tc was about 200 μm. In this case, R=Rc/Rb=0.30. The value of R being 0.30 satisfies 0.25<R<2.5. In this case, the substrate 22 and the collector for negative electrode 28 were appropriately bonded to each other by resistance welding without flying the paste-like material 23.

EXAMPLE 8

The substrate 22 was made of a steel containing Fe as a principal component, and tb was about 60 μm. The collector for negative electrode 28 was made of a steel containing Ni as a principal component, and tc was about 100 μm. In this case, R=Rc/Rb=0.42. The value of R being 0.42 satisfies

EXAMPLE 9

The substrate 22 was made of a steel containing Fe as a principal component, and tb was about 60 μm. The collector for negative electrode 28 was made of a steel containing Ni as a principal component, and tc was about 150 μm. In this case, R=Rc/Rb=0.28. The value of R being 0.28 satisfies 0.25<R<2.5. In this case, the substrate 22 and the collector for negative electrode 28 were appropriately bonded to each other by resistance welding without flying the paste-like material 23.

EXAMPLE 10

The substrate 22 was made of a steel containing Cu as a principal component, and tb was about 90 μm. The collector for negative electrode 28 was made of a steel containing Ni as a principal component, and tc was about 200 μm. In this case, R=Rc/Rb=1.84. The value of R being 1.84 satisfies 0.25<R<2.5. In this case, the substrate 22 and the collector for negative electrode 28 were appropriately bonded to each other by resistance welding without flying the paste-like material 23.

EXAMPLE 11

The substrate 22 was made of a steel containing Cu as a principal component, and tb was about 90 μm. The collector for negative electrode 28 was made of a steel containing Ni as a principal component, and tc was about 300 μm. In this case, R=Rc/Rb=1.23. The value of R being 1.23 satisfies 0.25<R<2.5. In this case, the substrate 22 and the collector for negative electrode 28 were appropriately bonded to each other by resistance welding without flying the paste-like material 23.

EXAMPLE 12

The substrate 22 was made of a steel containing Ni as a principal component, and tb was about 130 μm. The collector for negative electrode 28 was made of a steel containing Ni as a principal component, and tc was about 200 μm. In this case, R=Rc/Rb=0.65. The value of R being 0.65 satisfies 0.25<R<2.5. In this case, the substrate 22 and the collector for negative electrode 28 were appropriately bonded to each other by resistance welding without flying the paste-like material 23.

COMPARATIVE EXAMPLE 1

The substrate 22 was made of a steel containing Fe as a principal component, and tb was about 80 μm. The collector for negative electrode 28 was made of a steel containing Ni as a principal component, and tc was about 300 μm. In this case, R=Rc/Rb=0.19. The value of R being 0.19 does not satisfy 0.25<R<2.5. In this case, although there are some cases where the substrate 22 and the collector for negative electrode 28 were appropriately bonded to each other by resistance welding without flying the paste-like material 23, there are some cases where they were not appropriately bonded, so that bonding was unstable.

COMPARATIVE EXAMPLE 2

The substrate 22 was made of a steel containing Fe as a principal component, and tb was about 60 μm. The collector for negative electrode 28 was made of a steel containing Ni as a principal component, and tc was about 200 μm. In this case, R=Rc/Rb=0.21. The value of R being 0.21 does not satisfy 0.25<R<2.5. In this case, although there are some cases where the substrate 22 and the collector for negative electrode 28 were appropriately bonded to each other by resistance welding without flying the paste-like material 23, there are some cases where they were not appropriately bonded, so that bonding was unstable.

COMPARATIVE EXAMPLE 3

The substrate 22 was made of a steel containing Fe as a principal component, and tb was about 60 μm. The collector for negative electrode 28 was made of a steel containing Ni as a principal component, and tc was about 300 μm. In this case, R=Rc/Rb=0.14. The value of R being 0.14 does not satisfy 0.25<R<2.5. In this case, although there are some cases where the substrate 22 and the collector for negative electrode 28 were appropriately bonded to each other by resistance welding without flying the paste-like material 23, there are some cases where they were not appropriately bonded, so that bonding was unstable.

COMPARATIVE EXAMPLE 4

The substrate 22 was made of a steel containing Cu as a principal component, and tb was about 90 μm. The collector for negative electrode 28 was made of a steel containing Fe as a principal component, and tc was about 200 μm. In this case, R=Rc/Rb=2.62. The value of R being 2.62 does not satisfy 0.25<R<2.5. In this case, although there are some cases where the substrate 22 and the collector for negative electrode 28 were appropriately bonded to each other by resistance welding without flying the paste-like material 23, there are some cases where they were not appropriately bonded, so that bonding was unstable.

COMPARATIVE EXAMPLE 5

The substrate 22 was made of a steel containing Cu as a principal component, and tb was about 90 μm. The collector for negative electrode 28 was made of a steel containing Fe as a principal component, and tc was about 150 μm. In this case, R=Rc/Rb=3.49. The value of R being 3.49 does not satisfy 0.25<R<2.5. In this case, when the substrate 22 and the collector for negative electrode 28 are resistance-welded to each other, the paste-like material 23 flew, so that they were not appropriately bonded to each other.

COMPARATIVE EXAMPLE 6

The substrate 22 was made of a steel containing Fe as a principal component, and tb was about 50 μm. The collector for negative electrode 28 was made of a steel containing Ni as a principal component, and tc was about 400 μm. In this case, R=Rc/Rb=0.09. The value of R being 0.09 does not satisfy 0.25<R<2.5. In this case, when the substrate 22 and the collector for negative electrode 28 are resistance-welded to each other, the paste-like material 23 flew, so that they were not appropriately bonded to each other.

As described above, comparing Examples 1–12 with Comparative Examples 1–6, it is required to satisfy 0.25<R<2.5 in order to appropriate the substrate 22 and the collector for negative electrode 28 to each other by resistance welding without flying the paste-like material 23.

As described above, according to the present invention, the paste-like material 23 is formed on the entire surface including the edge 22a of the substrate 22, and the negative electrode plate 21 and the collector for negative electrode 28 can be bonded to each other by resistance welding without removing the paste-like material 23 formed on the substrate 22 once. Therefore, it is possible to remarkably simplify the steps of producing a battery. Conventionally, if the substrate 22 is resistance-welded to the collector for negative electrode 28 while the paste-like material 23 is provided on the entire surface of the substrate 22, there is caused a phenomenon that the paste-like material 23 and so forth fly, so that such a method is naturally inadequate.

Since the paste-like material 23 can be provided on the entire surface of the substrate 22, it is possible to increase the capacity of the battery in the limited volume of the battery.

While the stand tabs 31 of the collector for negative electrode 28 have been formed along both of edges extending in radial directions of the plurality of radially extending cut-out portions 29, the present invention should not be limited thereto, but the stand tabs 31 may stand so as to be capable of being resistance-welded to the longitudinally extending edge 22a of the negative electrode plate 21.

As described above, according to the present invention, when the negative electrode plate for battery, wherein the paste-like material containing the active material is provided on the entire surface of the rectangular conductive porous substrate including the longitudinally extending edge portion, is resistance-welded to the ribs which is formed by raising part of the plate-like collector, they are resistance-welded without removing the paste-like material on the edge portion of the conductive porous substrate while the paste-like material is provided on the edge portion. Therefore, it is possible to simply produce a battery at a smaller number of steps, and it is possible to increase the capacity of the battery.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A battery comprising:
    a battery can;
    a negative electrode plate for battery, said negative electrode plate having a paste-like material which contains an active material and which is provided on the entire surface of a rectangular conductive porous substrate including edge portions extending along long sides of the substrate, said negative electrode plate being wound in a cylindrical shape to be inserted into said battery can; and
    a plate-shaped collector having ribs formed by raising part thereof, said ribs being resistance-welded to one of said edge portions of said conductive porous substrate while said paste-like material provided on said edge portions;
    wherein 0.25<R<2.5 is satisfied assuming that a specific electrical resistance of said conductive porous substrate is rb, a thickness of said conductive porous substrate being tb, a ratio rb/tb of rb to rb being Rb, a specific electrical resistance of said plate-like collector being rc, a thickness of said plate-like collector being tc, a ratio rc/tc of tc to rc being Rc, and a ratio Rc/Rb of Rc to Rb being R.

2. A battery as set forth in claim 1, wherein said plate-like collector has cut-out portions which are formed so as to extend in a radial direction inwardly from a periphery thereof, said ribs being formed by raising part thereof along both of radially extending edges of each of said cut-out portions.

3. A battery as set forth in claim 1, wherein said conductive porous substrate is made of a steel, tb being in the range of from about 60 µm to about 80 µm, said plate-like collector being made of iron or nickel, and tc being in the range of from about 150 µm to about 200 m.

4. A battery as set forth in claim 1, wherein said conductive porous substrate is made of a punching metal.

5. A negative electrode plate for a battery, wherein a paste-like material containing an active material is provided on the entire surface of a rectangular conductive porous substrate including an edge portion extending along a long side thereof, said negative electrode plate being wound in a cylindrical shape to be inserted into a battery can to be used a part of a better;
    wherein 0.25<R<2.5 is satisfied assuming that a specific electrical resistance of said conductive porous substrate is rb, a thickness of said conductive porous substrate being tb, a ratio rb/tb of rb to rb being Rb, a specific electrical resistance of said plate-like collector being rc, a thickness of said plate-like collector being tc, a ratio rc/tc of tc to rc being Rc, and a ratio Rc/Rb of Rc to Rb being R.

* * * * *